United States Patent [19]
Ohtaka et al.

[11] Patent Number: 6,055,376
[45] Date of Patent: Apr. 25, 2000

[54] OBSERVATION OPTICAL SYSTEM AND OPTICAL APPARATUS HAVING THE SAME

[75] Inventors: Keiji Ohtaka; Keiji Ikemori, both of Yokohama, Japan

[73] Assignee: Canon Kabushiki Kaisha, Tokyo, Japan

[21] Appl. No.: 09/145,209

[22] Filed: Sep. 1, 1998

[30] Foreign Application Priority Data

Sep. 5, 1997 [JP] Japan ................................. 9-240973
Jan. 19, 1998 [JP] Japan ................................. 10-021397

[51] Int. Cl.[7] .......................... G03B 13/06; G03B 17/56; A61B 3/10; G02B 25/00
[52] U.S. Cl. ............................ 396/51; 396/373; 396/382; 396/544; 359/507; 359/643; 351/210
[58] Field of Search .............................. 396/51, 373, 382, 396/544; 359/507, 512, 513, 643; 351/210

[56] References Cited

U.S. PATENT DOCUMENTS 5,453,809  9/1995  Miyano ................................... 354/219
5,570,156  10/1996 Arai et al. ................................ 396/51

FOREIGN PATENT DOCUMENTS 0 657 767  6/1995  European Pat. Off. .
0 716 051  6/1996  European Pat. Off. .
57-130022  8/1982  Japan .
61-172552  8/1986  Japan .
7-248401  9/1995  Japan .
8-231944  9/1996  Japan .

OTHER PUBLICATIONS

Patent Abstracts of Japan, vol. 6, No. 229 (P–155) (JP 57–130022, Aug. 12, 1982), Nov. 16, 1982.
Patent Abstracts of Japan, vol. 96, No. 1 (JP 07–248401, Sep. 26, 1995), Jan. 31, 1996.

*Primary Examiner*—W. B. Perkey
*Attorney, Agent, or Firm*—Fitzpatrick, Cella, Harper & Scinto

[57] ABSTRACT

An observation optical system whose eye relief is below 25 mm includes an eyepiece lens having a water absorptive antifogging coating applied on one surface thereof, and a member holding the eyepiece lens. Further, an eyeball-characteristic detecting system includes a light source for illuminating the eyeball of an observer, a light receiving element arranged on detection of the reflected light from the eyeball through the eyepiece to produce a signal, an optical member positioned in the path of the light from the light source to the light receiving element and having an antifogging coating on one surface thereof, and a circuit receptive of the signal for detecting the characteristic of the eyeball.

31 Claims, 8 Drawing Sheets

FIG. 1

PRIOR ART

OBSERVATION OPTICAL SYSTEM AND OPTICAL APPARATUS HAVING THE SAME

BACKGROUND OF THE INVENTION

1. Field of the Invention

The present invention relates to observation optical systems, optical attachments and eyeball-characteristic detecting systems and, more particularly, to such systems which are suited to be used in the viewfinder optical systems of cameras or the like.

2. Description of Related Art

Figure 1:
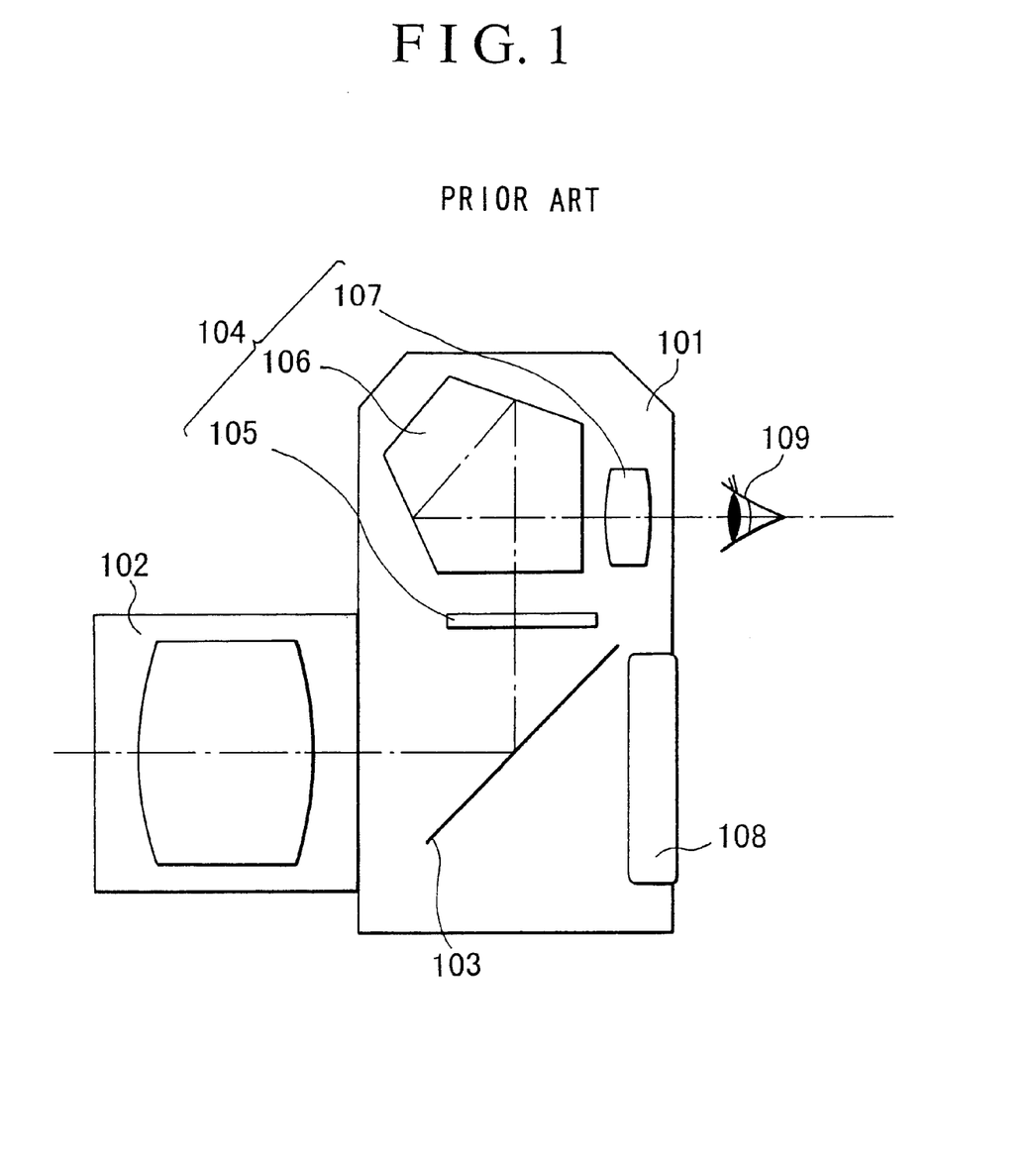
FIG. 1 is a schematic view of the construction of a conventional single-lens reflex camera.

FIG. 1 is a longitudinal section view of the conventional single-lens reflex camera.

In FIG. 1, a camera body 101 with a photographic lens 102 contains a return mirror 103, a viewfinder system 104 composed of a focusing screen 105, a pentagonal prism 106 and an eyepiece lens 107, and a back cover 108. The photographer, while keeping his or her eye 109 in axial alignment with the eyepiece lens 107, observes an image formed on the focusing screen 105 by the photographic lens 102.

In such a holding position of the camera, as the photographer breathes through the mouth or nose, warm humid air ascends along the surface of the back cover 108, reaching the space between the eyepiece lens 107 and the eye 109 of the photographer. When the ambient temperature is low to make the temperature of the surface of the camera body 101 or the eyepiece lens 107 low, the cold surface of the eyepiece lens 107 partly cools the breath. So, in some events, dewdrops are deposited on the eyepiece lens 107 to make the eyepiece lens 107 fogged, so that it becomes difficult to observe the viewfinder image. Particularly, with a mask put on the nose and mouth for the purpose of protection against the cold, the eyepiece lens 107 tends to get fogged more easily. To avoid such a state from occurring, the photographer is obliged to stop breathing until a shot is completed. In another situation that, when the camera is moved from one place to another where the environment greatly changes in temperature or humidity, it also happens that condensation of moisture, not owing to the breath, takes place on the optical parts constituting the viewfinder.

To solve such problems, a method is known which uses solutions of surface active agents or the like having the antifogging effect. The solution is thinly applied to the surface of the eyepiece lens 107.

Figure 2:
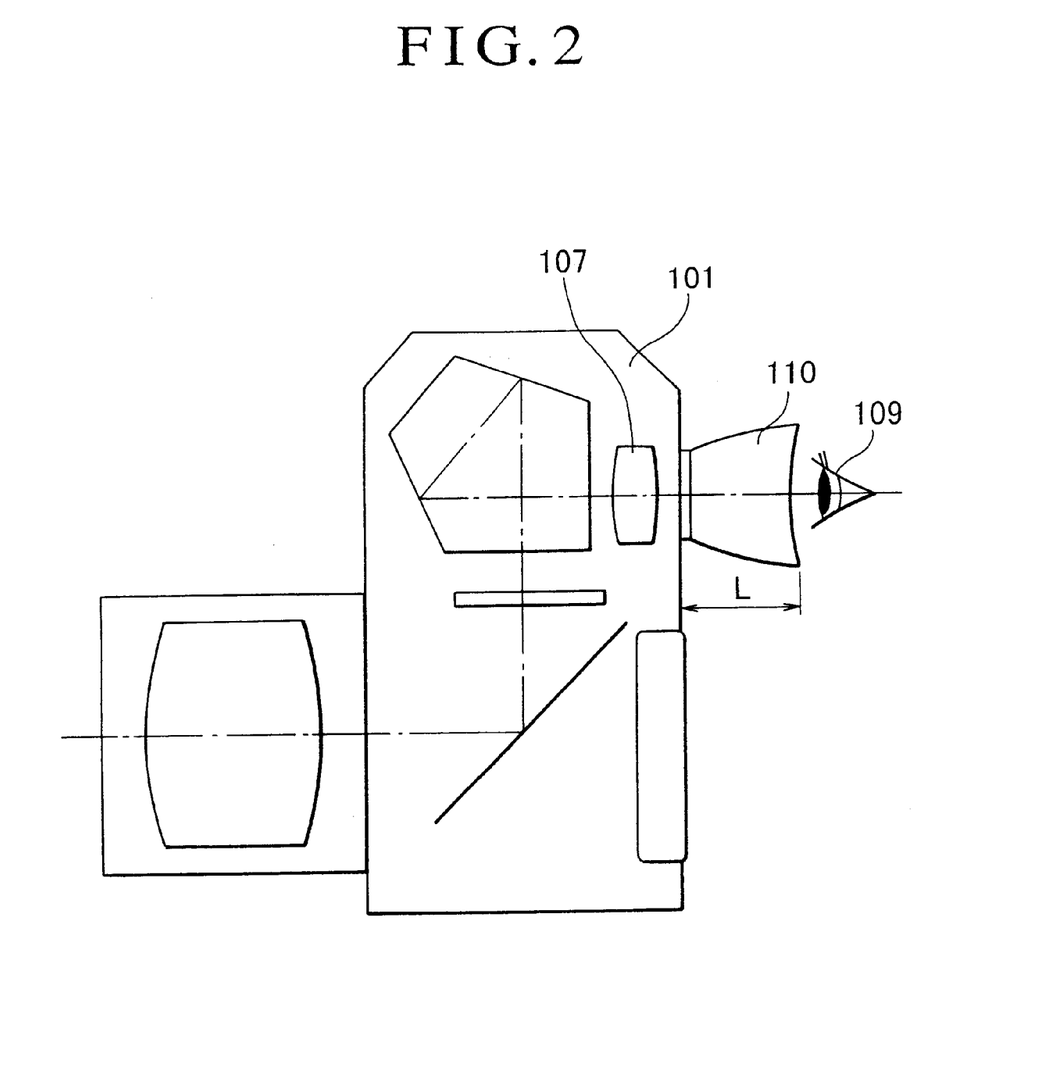
FIG. 2 is a schematic view of the construction of the conventional single-lens reflex camera provided with a hood.

Besides this, as shown in FIG. 2, it can be also considered to use a hood 110 surrounding the periphery of the eyepiece lens 107 so that the breath hardly touches the eyepiece lens 107.

For the breath fogging problem that becomes serious when the camera is used at a low temperature, different methods are available as described above. However, any of these methods has the following drawbacks.

The method using the surface active agent does not insure that, as the outer surface of the eyepiece lens is somewhat deep from the frame thereof, the solution is uniformly applied to the entire area of that surface. The antifogging effect is ensured only temporarily. Further, the surface active agent when applied to the surface makes it a hydrophile. In other words, the wettability is enhanced, thus producing the antifogging effect. Therefore, a thin film of water is formed on the surface. As the condensed amount of moisture increases, the image to be observed possibly eventually distorts.

In the other method which uses the hood shown in FIG. 2, the length L of the hood 110 must be made longer than a certain value to obtain a sufficient antifogging effect. It varies depending on the conditions of the environment. For example, at a temperature of −10° C., the desired length L is found to be 20 mm or longer. Otherwise, no antifogging effect can be obtained. In this case, the eye 109 of the observer is necessarily spaced away from the eyepiece lens 107 by a distance of about 25 mm. To measure how long the eye may be put away from the eyepiece lens to observe the entire area of the field of the viewfinder, a numerical variable called "eye relief" is usually adopted. For a viewfinder system whose eye relief exceeds 25 mm, its physical size becomes large. Therefore, a problem arises in that its price becomes high.

In the meantime, it has been known to provide the observation optical system such as the viewfinder of the camera with a visual line detecting device for detecting that location on the viewfinder image which the observer looks at, or for detecting the direction of a visual line of the observer.

With such a visual line detecting device, in detecting the current visual line of the observer, it becomes possible either to determine a specific focusing position on which the photographic lens is to be adjusted for focusing by the automatic focusing device built in the camera, or to selectively choose the menu displayed in the viewfinder. Thus, the photographer can operate the camera with higher mobility.

It is also known to provide a technique of detecting the refractive power of the eyeball of the observer, i.e., the diopter, to automatically drive a diopter correcting optical system, thus adjusting the diopter.

To make determination of the above-described eyeball characteristic such as the visual line and diopter of the observer, many principles have been proposed. Of these, there is a one that a light-emitting diode or like light source illuminates the eyeball of the observer and an optical system adjacent to the eye receives the reflected light from the eyeball and forms an image of the eyeball on a light receiving element (sensor). Using the image information as the signal from the sensor, the current eyeball characteristic is detected. This method is employed in many ordinary optical apparatus.

In the case of, for example, the camera, depending on the environment in which the camera works, it is possible that, as described before, fogging due to the temperature or humidity affects some optical parts of the above-described optical systems for illumination and for receiving the reflected light. If the fogging occurs, then not only the visual line and diopter become impossible to detect but also a faulty operation will take place to effect an unintentional result.

BRIEF SUMMARY OF THE INVENTION

The present invention has been made with the above described problem in mind, and it is a general object of the invention is to realize an observation optical system, an optical attachment, or an eyeball-characteristic detecting system of high precision accuracy which has a permanent antifogging effect, while still not sacrificing the comfortableness for viewing.

To attain the above object, in accordance with an aspect of the invention, there is provided an observation optical system whose eye relief is below 25 mm, in which an antifogging coating having a property of absorbing water is formed on at least one surface of members constituting the eyepiece optical system.

In accordance with another aspect of the invention, there is provided an optical apparatus comprising the observation optical system of the invention.

In accordance with a further aspect of the invention, there is provided an optical attachment which is releasably mounted between an eyepiece optical system and the eye of the observer, which comprises an optical member and means for shielding a space between the optical member and the eyepiece optical system substantially from outside air, wherein an antifogging coating having a property of absorbing water is formed on the optical member.

Further, in accordance with a still further aspect of the invention, there is provided an eyeball-characteristic detecting system, which comprises a light source for emitting light for illuminating an eyeball of an observer, a light receiving element arranged to receive light reflected from the eyeball through an eyepiece optical system, an optical member provided in an optical path from the light source to the light receiving element, the optical member having at least one surface on which an antifogging coating is formed, and means for detecting a characteristic of the eyeball by utilizing a signal outputted from the light receiving element.

DETAILED DESCRIPTION OF THE INVENTION

Hereinafter, preferred embodiments of the invention will be described in detail with reference to the drawings.

Figure 3:
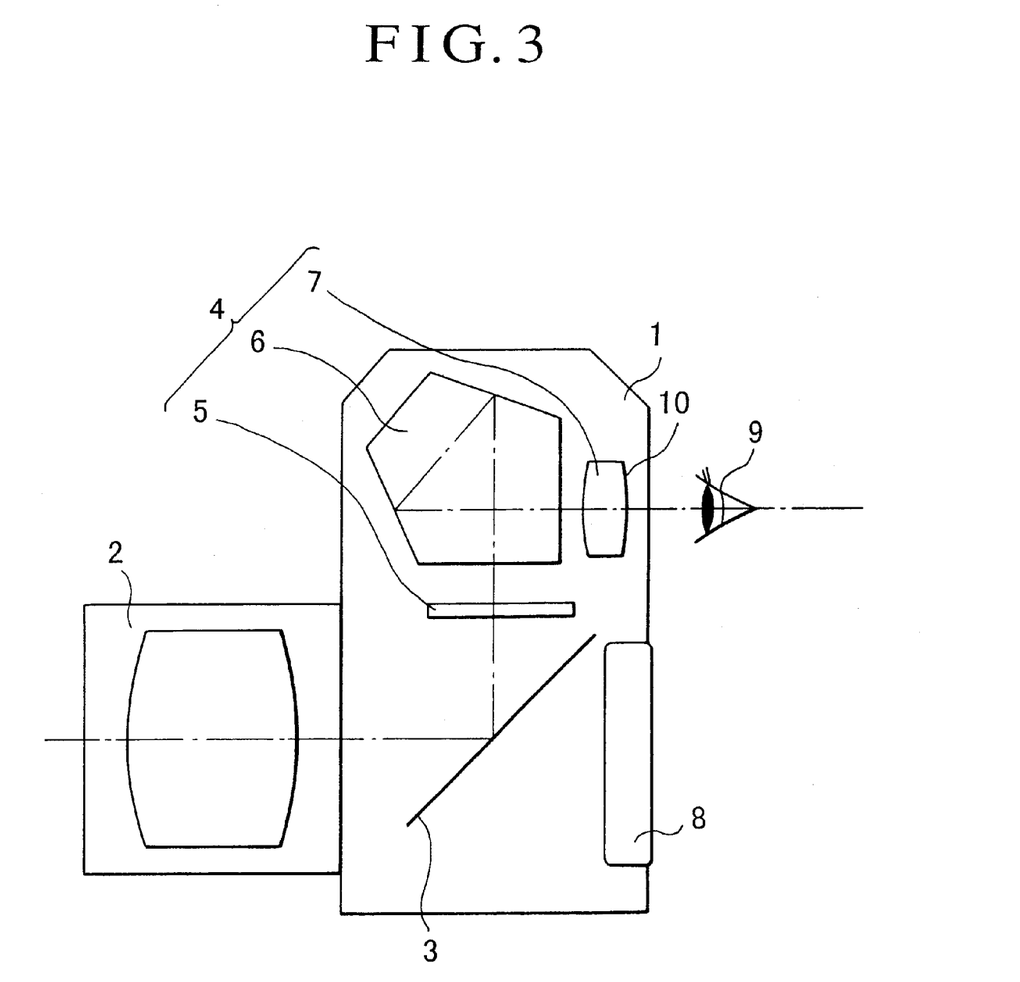
FIG. 3 is a schematic view of the construction of a single-lens reflex camera according to a first embodiment of the invention.

FIG. 3 is a longitudinal section view of the construction of a single-lens reflex camera having an observation optical system according to an embodiment of the invention.

In FIG. 3, a camera body 1 with a photographic lens 2 contains a return mirror 3, a viewfinder system 4 composed of a focusing screen 5, a pentagonal prism 6 and an eyepiece lens 7, and a back cover 8. The photographer, while keeping hold of his or her eye 9 in axial alignment with the eyepiece lens 7, observes an image formed on the focusing screen 5 by the photographic lens 2.

While holding the camera in such a position, the observer looks through the viewfinder system. Then, the breath from the mouth or nose of the photographer ascends along the surface of the back cover 8, passing through the space between the eyepiece lens 7 and the eye 9. When the ambient temperature is low, it is in the conventional arrangement that part of the breath touches the cold surface of the eyepiece lens 7, where the condensation of moisture results in fogging. In the present embodiment, on the other hand, of the optical members constituting the eyepiece lens 7, at least one surface which is exposed to the open air, i.e., the surface 10 that is closest to the observer, is provided with an antifogging coating having a property of absorbing water. The eyepiece lens 7 is thus prevented from being fogged by the breath of the observer.

In a case where a long eye relief can be secured, as described before, the hood may be attached to the eyepiece lens 7, reducing the proportion of that part of the breath which directly hits the eyepiece lens 7. Fogging is thus made possible to avoid. However, in a case where the eye relief is shorter than 25 mm., such a method can hardly prevent the fogging from occurring completely.

Therefore, the observation optical system of the invention produces the greatest effect when the eye relief is shorter than 25 mm. For an observation optical system of smaller size, especially the viewfinder with the eye relief made shorter than 15 mm, the invention is more advantageous.

To form the antifogging coating having a property of absorbing water, many antifoggy agents are known. In the first embodiment, use is made of what is disclosed in Japanese Laid-Open Patent Application No. Hei 8-231944. This antifoggy agent is a composition of (1) inorganic alkoxide and at least one polymer formed from this alkoxide by hydrolysis and poly-condensation and having OH radicals, (2) polyalkylene oxide, (3) catalyst, and (4) water-contained organic solvent.

As the alkoxide cited above, at least one of the compounds expressed by the following formula is preferably usable.

$$M(OR)_n(X)_{a-n}$$

where M is an inorganic atom selected from the group consisting of Si, Al, Ti, Zr, Ca, Fe, V, Sn, Li, Be, B and P, R is alkyl radicals, X is alkyl radicals with or without functional groups, or halogen, "a" is the valence of M, and "n" is an integer of from 1 to "a".

As the polyalkylene oxide cited above, polyethylene oxide is preferably used.

As the basic catalyst cited above, N,N-dimethylbenzylamine is preferably used.

In addition to the ingredients described above, at least one of polyacrylic acids may be included. More specifically, polyacrylic acid, poly-methacrylic acid and their salts may be mentioned. At least one selected out of these is preferably used.

A specific example of the above-described antifoggy agent in respect to the ingredients with weight parts is shown in Table-1 below.

TABLE-1

| | |
|---|---|
| 10% polyethylene oxide in methanol | 81.52 |
| 5% polyacrylic acid in methanol | 0.26 |
| N,N-dimethylbenzylamine | 0.01 |
| γ-glycid propyltrimethoxysilane | 13.59 |
| Aluminum isopropoxide in ethanol | 4.62 |

According to the weight proportion of the Table-1, the polyacrylic acid, N,N-dimethylbenzylamine and γ-glycidoxy propyltrimethoxysilane are added to the methanol solution of 10% polyethylene oxide (mean molecular weight: 300,000). The mixture is stirred for 10 minutes. After that, as aluminum isoproxide was previously hydrolyzed, its methanol solution (containing 5% $Al_2O_3$) is added. The mixture is stirred for 30 minutes. The thus-obtained solution is applied either to both surfaces of the eyepiece lens, or to the one of the surfaces which is exposed to the outside. The coating is dried (annealed) by heating to, and keeping at, 150° C. for 10 minutes.

The obtained eyepiece lens was incorporated in the camera and left lying for 2 hours in an atmosphere of −10° C. After that, in the same atmosphere, the observer looked through the viewfinder, while breathing through the mouth or nose. However, the eyepiece lens did not get fogged in every test.

Since the ability the above-described antifoggy agent has to prevent fogging from occurring relies on its property of absorbing water, so that it produces such an antifogging effect, the coating on the lens surface must have a certain thickness. In the case of the antifoggy agent or composition described above, to get satisfactory results in the usual photographic situations, the coating is desired to be thickened to not less than at least 0.5 $\mu$m. A more desirable coating is 1 $\mu$m or thicker.

If too thick a coating is formed on the lens, on the other hand, the dimensional accuracy of the surface becomes worse and, therefore, the image to be observed deteriorates. To assure observation without extreme deterioration of the image, the antifogging coating on the lens surface is desired to be 10 $\mu$m or less. If thinner than 5 $\mu$m, it is more desirable.

In the first embodiment, the application of the antifoggy agent is carried out by any technique known in the art using the dipping method, the spray method or the spin method. In a case where one cycle of coating operation hardly assures formation of a layer thick enough, the cycle of coating and annealing operations may be repeated twice or more.

Also, although the first embodiment has been described in connection with the antifogging coating applied directly to an optical member having a refractive power, that is, the eyepiece lens, a variation may be made by using a transparent plate of glass as the protection member having no refractive power at a closest position of the eyepiece optical system to the observer. The coating is applied to the one of the parallel flat surfaces of the plate which faces the observer, or both of them. The flat plane makes more uniform the coating than the surface of curvature and the plane accuracy is easier to hold than the surface accuracy. Further, if it is a plane surface, a plate of large size can be used as the substrate for applying the coating thereon. In the latter process, it can be cut to a necessary size. So, it is advantageous even in the point of view of the mass production.

Figure 4:
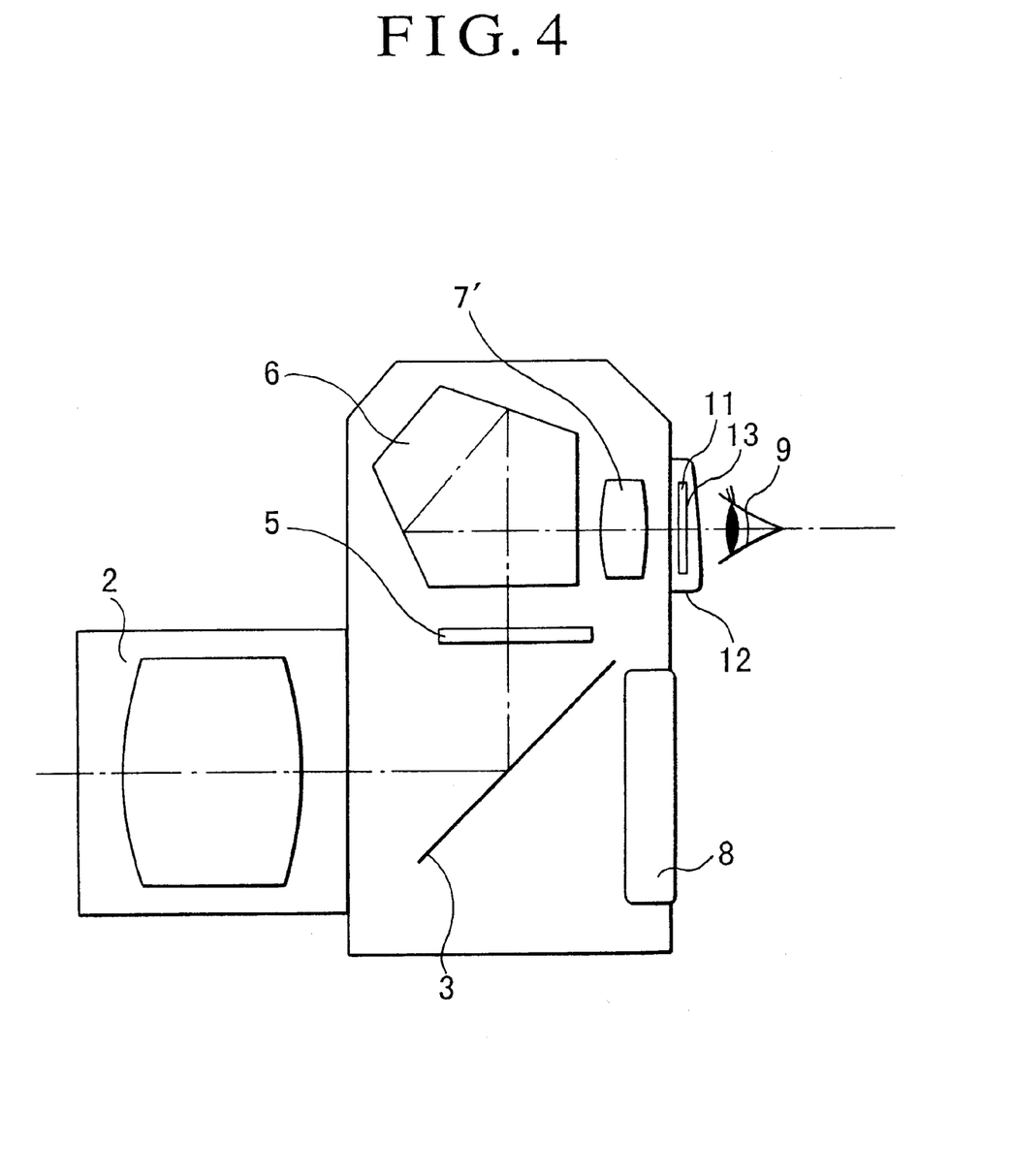
FIG. 4 is a schematic view of the construction of a single-lens reflex camera according to a second embodiment of the invention.

FIG. 4 is a longitudinal section view of a single-lens reflex camera according to a second embodiment of the invention, where the same parts as those of FIG. 3 are denoted by the same reference numerals.

In the second embodiment, an eyepiece lens 7' is different from the eyepiece lens 7 of the first embodiment in that its surfaces are not coated with the antifoggy agent. Instead of this, the second embodiment employs an antifogging unit 12 (optical attachment) including a transparent member 11 on the observer side of the eyepiece lens 7'. The transparent member 11 is a flat plate of glass whose both surfaces are parallel to each other, and at least the one of them which confronts the eye of the observer, namely, the surface 13, is coated with an antifoggy agent similar to that of the first embodiment.

The antifogging unit 12 of the second embodiment is made attachable to and detachable from the camera body 1 by a mechanism described below.

Figure 5A:
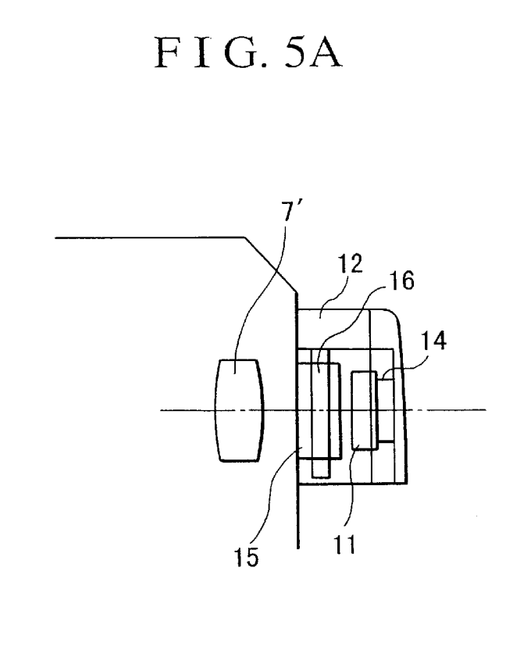
FIGS. 5A and 5B are schematic views of the construction of an eyepiece portion in the second embodiment.
Figure 5B:
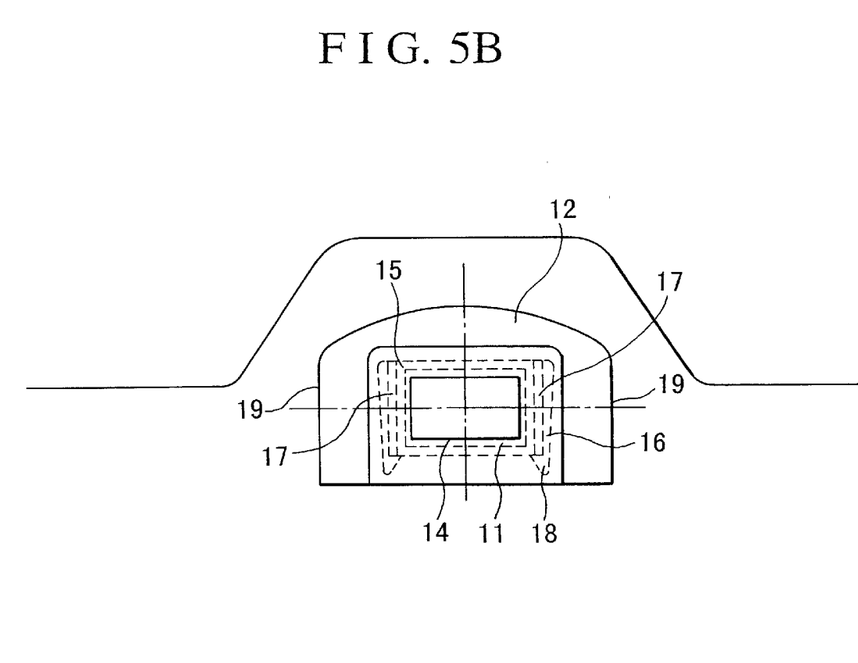

FIGS. 5A and 5B in an enlarged scale show only the eyepiece lens of FIG. 4 and its neighborhood, with FIG. 5A in an axial sectional view and FIG. 5B in an elevation back view as looked from the observer.

In FIGS. 5A and 5B, the antifogging unit 12 has an axial opening 14 of rectangular shape in which the transparent member 11 is fixedly mounted, and is movably fitted on a coupling frame 15 on the camera body 1. A claw member 16 fixedly secures the antifogging unit 12 to the coupling frame 15 of the camera.

Referring to FIG. 5B, the left and right sides of the coupling frame 15 have grooves 17 formed therein. The claw member 16, which is made of a resilient material, has a letter "U" shape with the open side down, so that the space between its free ends 18 is horizontally expandable. When attaching the antifogging unit 12, the user puts the free ends 18 of the claw member 16 above the coupling frame 15 in alignment with the grooves 17 and slides the antifogging unit 12 downward until the free ends 18 of the claw member 16 drop over the corners of the coupling frame 15. The antifogging unit 12 is thus locked. To release the antifogging unit 12 from the locking connection, the user presses the antifogging unit 12 from both sides at the upper half 19 thereof, thereby opening the free ends 18 of the claw member 16. While keeping the pressure, the user slides the antifogging unit 12 upward. The antifogging unit 12 is thus detached from the camera body 1.

In the state that the antifogging unit 12 is attached to the camera, the space between the eyepiece lens 7' and the transparent member 11 is desired to be air-tightly shielded, especially at the bottom, so that the breath of the observer cannot enter that space. However, to make easy the attaching or detaching operation, a gap of necessary minimum may be provided in between the coupling members. Even if so, almost no decrease of the antifogging effect has been found because the flow of breath is sufficiently blocked from entering.

Although the second embodiment has been described as using the transparent member 11 of the antifogging unit 12 in the form of a parallel flat plate of glass, it is also possible that the transparent member 11 takes the form of a lens. With the antifogging coating on both surfaces or one surface of that lens, the antifogging unit 12 then gets not only the antifogging function but also a function of correcting the diopter.

As a surface in the optical parts of the viewfinder of the camera is selected for application of the antifogging coating, that surface after being coated is desired to improve the light transmission by suppressing the reflection as far as possible. With this regard, the antifogging coating may be constructed to have the antireflection effect. To this purpose, many schemes are already available. Of these, the one that allows the antifogging aspect and the antireflection aspect to be compatible and is excellent in durability is suitably used, as disclosed in Japanese Patent Application No. Hei 9-213269. This scheme is that a thin film of high refractive index is made from metal alkoxide or at least one of the composites of metal alkoxide and inorganic materials and that this film is sandwiched between the antifogging coatings described before.

Figure 6:
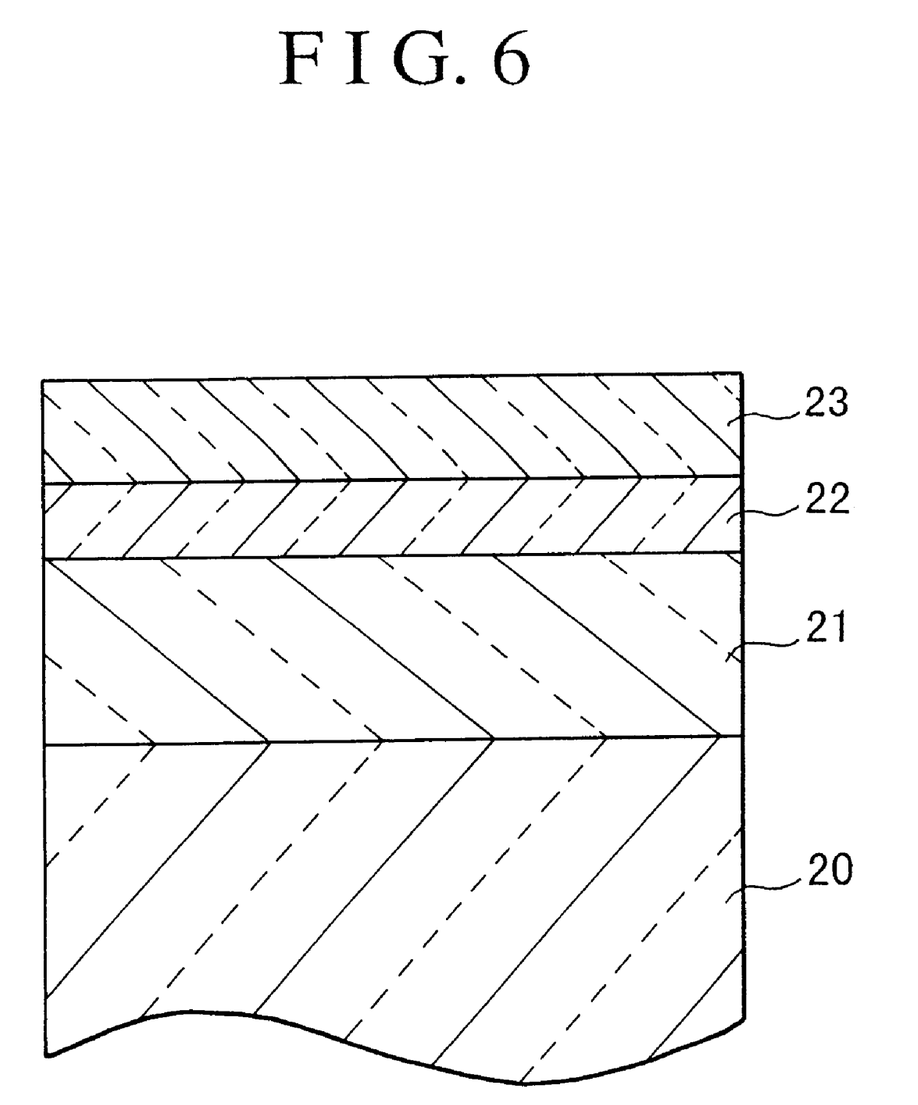
FIG. 6 is a sectional view of the structure of layers in an antifogging coating added with an antireflection effect.

FIG. 6 is a sectional view of the construction of a multi-layer antifogging coating which is given the antireflection effect by the scheme described above. In FIG. 6, a substrate glass 20 on which to apply such an antifogging coating corresponds to the eyepiece lens 7 of FIG. 3 or the transparent plate 11 of FIG. 4. The coating comprises a first antifog layer 21, an intermediate layer 22 of titan tetraisopropoxide and a second antifog layer 23 made of a similar material to that of the first antifog layer 21. For the purpose of convenience, the substrate glass 20 is depicted as a flat surface, but may have a curved surface, of course.

The thicknesses of these layers are shown in Table-2 below.

TABLE-2

| First Antifog Layer | 3 µm |
| Titan Tetraisopropoxide Layer | 30 nm |
| Second Antifog Layer | 135 nm (*) |

*)Optical Thickness

In Table-2, the first antifog layer 21 and the titan tetraisopropoxide layer 22 are in actual thicknesses, while the second antifog layer 23 is in optical thickness (=refractive index×thickness.)

The first antifog layer 21 is formed by using the same antifoggy agent as that of the first embodiment and in a similar way. Its thickness is concerned with the antifogging performance and the surface accuracy and is determined to a selected value out of the range of 0.5 µm to 10 µm, or desirably of 1 µm to 5 µm, depending on the aims, as mentioned before.

For the titan tetraisopropoxide layer 22, a solution of titan tetraisopropoxide in isobutyl acetate is applied by the dipping method and then dried. This layer has a refractive index of 1.7 or higher and plays a role of increasing the antireflection effect.

The second antifog layer 23 is very thin as compared with the first antifog layer 21. Therefore, the antifoggy agent has to be diluted to a low viscosity by a solvent or the like, before it is applied. The thickness of the second antifog layer 23 is determined to be ¼ of a wavelength at which to reduce the reflectance to a lowest value (or the design wavelength). In the case of the second embodiment, the design wavelength is 540 nm (=135 nm×4).

The above-described coating was formed on the transparent member 11 of FIG. 4 and, when tested, proved a sufficient antireflection effect without sacrificing the antifogginess.

For the antireflection capability to impart, the construction of the coating and the method of forming the layers are not limited to those described in connection with FIG. 6. Likewise as that disclosed in Japanese Patent Application No. Hei 9-212088, a porous inorganic layer may be formed on the antifog layer.

By the way, in the atmospheric condition that the ordinary optical system without the antifogging provision gets fogged, moisture condenses not only on the optical system but also on the exposed-to-air surfaces of the members that hold it. As the condensed amount increases, dewdrops grow, eventually running down to the surfaces of the optical system.

With such situations in mind, the invention is desired to apply its antifogging coating to that optical system which is mounted in a mechanism constructed with parts of materials which exhibit somewhat high hydrophilicity. The above-described running of dewdrops is thus prevented or lessened. For the mounting members, the hydrophilicity in terms of the angle of contact with water is necessarily less than 90° and more desirably 70° or less. In actual practice, resin materials that meet such a condition is chosen to be used, or the surface are finished to a minute roughness.

It will be appreciated from the foregoing that, according to the first and second embodiments, it becomes possible to realize an observation optical system which has a permanent antifogging effect while still not sacrificing the comfortability of observation.

Figure 7:
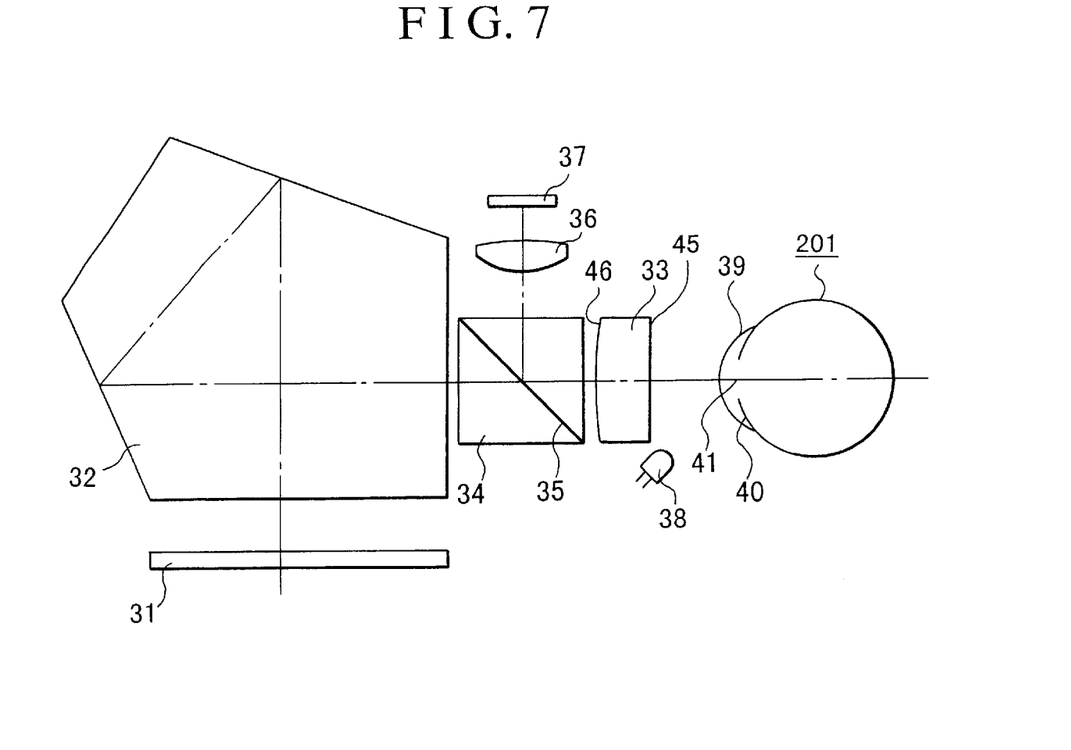
FIG. 7 is a schematic view of the construction of a single-lens reflex camera according to a third embodiment of the invention.

A third embodiment of the invention is next described as applied to the viewfinder of camera which is provided with a visual line detecting means for detecting the visual line of the eyeball of an observer. FIG. 7 is a sectional view of the main parts of the third embodiment. In FIG. 7, an image of an object to be photographed is formed on a focusing screen 31 by a photographic lens (not shown). A pentagonal prism 32 laterally reverses and erects the image, which is observed through an eyepiece lens 33.

A dichroic prism 34 has a cemented surface 35 that transmits the visual light but reflects an infrared light which cannot be perceived by the observer, constituting an optical unit of the eyeball-characteristic (visual line) detecting system together with an image forming lens 36, a light receiving element 37 such as area sensor and a light-emitting diode 38. The light-emitting diode 38 emits an infrared light of that nature which undergoes reflection from the cemented surface 35 of the dichroic prism 34. To the observer looking through the viewfinder, this light is invisible when illuminating his or her eyeball 201 by light projection means (not shown). The eyeball 201 has a cornea 39, an iris 40 and a pupil 41.

The third embodiment, although using the dichroic prism 34, insures that, because its cemented surface 35 has a spectral characteristic that reflects the infrared light but completely transmits the visible light, the object image on the focusing screen 31 the observer views as the laterally reverse, erected image through the pentagonal prism 32 can retain the same brightness as in the conventional camera.

In the meantime, the light emitted from the light-emitting diode 38 is projected by a projection lens or like means (not shown) onto the eyeball 201. The reflected light from the cornea 39 and iris 40 passes through the eyepiece lens 33 in the reverse direction to that with the light coming from the focusing screen 31 and going to be observed. It then reflects from the cemented surface 35 in the dichroic prism 34 upward, and then passes through the image forming lens 36, by which information concerning the eyeball, for example, Purkinje image, is formed on the light receiving element 37. Therefore, the eyepiece lens 33 and the dichroic prism 34 are used as the common members in both of the viewfinder optical system and the optical system for detecting the visual line of the eyeball 201.

Figure 8:
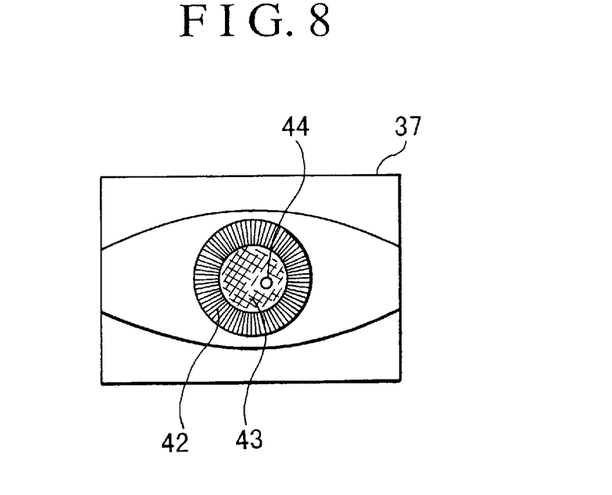
FIG. 8 is a schematic view of an ideal image of the eyeball.

FIG. 8 is a top view of the image receiving surface of the light receiving element 37, schematically showing what images about the eyeball 201 are cast thereon at this time. In FIG. 8, images 42 and 43 are of the iris 40 and pupil 41, respectively. An image of the light-emitting diode 38 is formed with the light reflecting from the cornea 39 of FIG. 7, constituting a first Purkinje image 44.

Using the signal outputted from the light receiving element 37, the visual line of the observer is detected by a method known in the art. As this detecting method, use may be made of that disclosed in, for example, Japanese Laid-Open patent Application No. Sho 61-172552. In this reference, the image signal from the light receiving element 37 is processed to find the center of the pupil image 43 and the location of the first Purkinje image 44. From the relationship between their current positions, which direction the observer looks to is detected.

To assure detection of the visual line with high accuracy and reliability even in a wide variety of atmospheric conditions described before, it is in the third embodiment that at least the closer surface 45 of the eyepiece lens 33 of FIG. 7 to the observer is provided with an antifogging coating. Another coating of such property may be applied to the inner surface 46 of the eyepiece lens 33. If so, the inside fogging resulting from the change of the ambient temperature also can be prevented well.

The antifogging coating may be applied to not only the eyepiece lens 33 but also other members such as dichroic prism 34 and image forming lens 36. According to this, the accuracy of detection can be prevented from lowering due to the fogging. Further, the light receiving element 37 and the optical parts through which the light from the light-emitting diode 38 travels may be given the antifogging coating likewise.

As the antifogging coating in the third embodiment, use can be made of what the principle of hydrophileness, water repellence or water absorption is applied to. In the case of requiring the maintenance of the optical performance, it is desired to employ the coating which, as described in the first and second embodiments, has the property of absorbing water in producing the antifogging effect. This is because the hydrophilic one lets a thin film of water be left on the surface and the water repellent one is difficult to remove the dewdrops completely. In either case, the optical performance is caused to deteriorate. Unlike these, the water absorptive coating diminishes dewdrops as soon as they appear, so that it is most excellent in the point of view of the good stability of optical performance.

For the antifogging coating of water absorptiveness to make up, a specific example of the antifoggy agent is similar to those shown in the first and second embodiments. So, the description thereof is omitted here.

Even in the third embodiment, the antifogging coating may be also given the antireflection property like that in the first and second embodiments. However, when putting the third embodiment to practice, it is preferred that the antireflection coating has such characteristics that not only the light transmission through the viewfinder of the camera is improved but also the electrical signal representing the detected visual line is deprived of noises resulting from the ghost and flare. That is, even for the infrared light from the light-emitting diode 38, a sufficient antireflection effect has to be produced. Based on the various experiments, it has been found that the visual line is detected in good results when the reflectance for the wavelength of the light-emitting diode of the antifogging coating is limited to not more than 2%. On consideration of the situation that, as the observer wears glasses, strong unnecessary light rays are liable to arise, the reflectance must be further reduced to 1% or lower.

In such a situation, it is preferred to employ the scheme like that disclosed in Japanese Patent Application No. Hei 9-212088, where a porous inorganic layer is formed on the top of the antifog layers.

Figure 9:
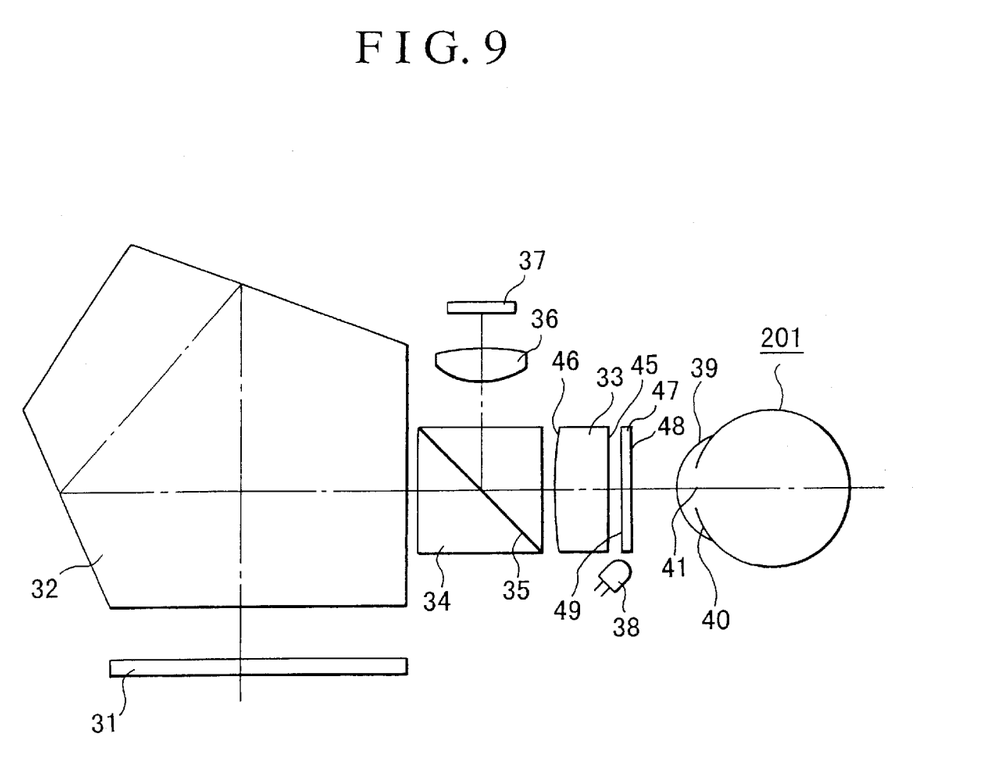
FIG. 9 is a schematic view of the construction of a single-lens reflex camera according to a fourth embodiment of the invention.

FIG. 9 is a sectional view of the main parts of a fourth embodiment of the invention, where the same reference numerals as those of FIG. 7 are used to denote the same elements.

The fourth embodiment is different from the third embodiment of FIG. 7 in a point that a protection member 47 in the form of a parallel flat plate is provided on the observer side of the eyepiece lens 33 and at least one of its surfaces, namely, the closer surface 48 to the observer and the surface 49 of the object side. The other constructional features are the same.

In general, uniform coatings are more easily applied to flat surfaces than to curved surfaces. In the fourth embodiment, such a plate is selected to form the antifogging coating thereon, thus retaining the good surface accuracy. Further, if the substrate is a plate whose both surfaces are flat and parallel to each other, the size of the plate can be increased greatly. In the latter process, it can be cut to necessary sizes. So, it is advantageous even in the point of view of the mass production.

Further, the protection member 47 may be built in an appropriate carrier, which is made releasably attachable to the coupling member for the diopter correcting lens or the like provided on the housing of the eyepiece lens of the camera. If so, the invention becomes applicable to the existing cameras having no antifogging coatings. In the situation where no antifogging effect is necessary, the carrier can be removed to elongate the eye relief. The viewfinder becomes more comfortable to look through.

Although the foregoing embodiments have been described as applied to part of the viewfinder of the camera, the invention is not confined thereto and is applicable to binoculars, telescopes, microscopes, endoscopes, etc., generally speaking, to a wide variety of commonly available observation optical systems.

Also, the eyeball characteristic to be detected includes not only the visual line of the observer mentioned in the foregoing embodiments, but also the degree of sight, the state of the eyeground and other factors that can be detected by the reflected light from the eyeball.

It will be appreciated from the foregoing that, according to the third and fourth embodiments, at least one of the optical members constituting the optical system for detecting the characteristic of the eyeball of the observer, is provided with an antifogging coating, thereby making it possible to achieve an eyeball-characteristic detecting system which can detect well the characteristic of the eyeball no matter how the ambient atmosphere and the environmental conditions may change, and to achieve an optical apparatus having the eyeball-characteristic detecting system.

In particular, despite of any changes of the ambient atmosphere and the environmental condition, the accuracy of detection is prevented from lowering. An eyeball-characteristic detecting system which has such characteristic features, or an observation optical system having the eyeball-characteristic detecting system, is possible to realize easily.

What is claimed is:

1. An observation optical system comprising:
   an eyepiece optical system, said eyepiece optical system having an antifogging coating having a property of absorbing water applied on at least one surface of members constituting said eyepiece optical system; and
   a holding member arranged to hold said eyepiece optical system,
   wherein said observation optical system has an eye relief of not more than 25 mm.

2. An observation optical system according to claim 1, wherein the surface having said antifogging coating is a surface closest to an observer.

3. An observation optical system according to claim 1, wherein the member having said antifogging coating is an eyepiece lens.

4. An observation optical system according to claim 1, wherein the member having said antifogging coating is a protection member for protecting an eyepiece lens.

5. An observation optical system according to claim 1, wherein said antifogging coating is made up from a composition including at least one of inorganic alkoxide and polymer having OH radicals formed from the inorganic alkoxide by hydrolysis and poly-condensation.

6. An observation optical system according to claim 1, wherein said antifogging coating has a thickness between 0.5 µm and 10 µm inclusive.

7. An observation optical system according to claim 1, wherein the surface having said antifogging coating further has an antireflection coating.

8. An observation optical system according to claim 7, wherein said antireflection coating is a thin film of high refractive index made from metal alkoxide or at least one of composites of metal alkoxide and inorganic materials.

9. An observation optical system according to claim 7, wherein said antireflection coating is a porous inorganic coating.

10. An observation optical system according to claim 1, wherein said holding member arranged to hold said eyepiece optical system has an angle of contact with water of not more than 90°.

11. An observation optical system according to claim 1, further comprising:
    a light source, said light source emitting light for illuminating an eyeball of an observer;
    a light receiving element, said light receiving element receiving light reflected from the eyeball, through said eyepiece optical system; and
    eyeball-characteristic detecting means for detecting a characteristic of the eyeball by utilizing a signal outputted from said light receiving element.

12. An observation optical system comprising:
    an eyepiece optical system, said eyepiece optical system having an antifogging coating applied on at least one surface of members constituting said eyepiece optical system;
    a light source, said light source emitting light for illuminating an eyeball of an observer;
    a light receiving element, said light receiving element receiving light reflected from the eyeball through said eyepiece optical system; and
    eyeball-characteristic detecting means for detecting a characteristic of the eyeball by utilizing a signal outputted from said light receiving element.

13. An optical apparatus comprising:
    an observation optical system according to one of claims 1 to 12.

14. An optical attachment releasably mounted in between an eyepiece optical system and an eye of an observer, said optical attachment comprising:
    an optical member, said optical member having an antifogging coating having a property of absorbing water applied on at least one surface thereof;
    a holding member arranged to hold said optical member;
    means for isolating a space between said optical member and said eyepiece optical system substantially from outside air; and
    a pair of claw portions for fixing said optical attachment to the eyepiece optical system.

15. An optical attachment according to claim 14, wherein the surface having said antifogging coating is a surface closest to the observer.

16. An optical attachment according to claim 14, wherein said optical member has a refractive power.

17. An optical attachment according to claim 14, wherein said antifogging coating is made up from a composition including inorganic alkoxide and at least one polymer having OH radicals formed from the inorganic alkoxide by hydrolysis and poly-condensation.

18. An optical attachment according to claim 14, wherein said antifogging coating has a thickness between 0.5 µm and 10 µm inclusive.

19. An optical attachment according to claim 14, wherein the surface having said antifogging coating further has an antireflection coating.

20. An optical attachment according to claim 19, wherein said antireflection coating is a thin film of high refractive index made from metal alkoxide or at least one of composites of metal alkoxide and inorganic materials.

21. An optical attachment according to claim 19, wherein said antireflection coating is a porous inorganic coating.

22. An optical attachment according to claim 14, wherein said holding member arranged to hold said optical member has an angle of contact with water of not more than 90°.

23. An eyeball-characteristic detecting system comprising:
    a light source, said light source emitting light for illuminating an eyeball of an observer;
    a light receiving element, said light receiving element receiving light reflected from the eyeball through an eyepiece optical system;
    an optical member provided in an optical path in which the light emitted from said light source advances to said light receiving element, said optical member having an antifogging coating applied on at least one surface thereof; and
    eyeball-characteristic detecting means for detecting a characteristic of the eyeball by utilizing a signal outputted from said light receiving element.

24. An eyeball-characteristic detecting system according to claim 23, wherein said antifogging coating has a property of absorbing water.

25. An eyeball-characteristic detecting system according to claim 23, wherein the surface having said antifogging coating is a surface closest to the observer.

26. An eyeball-characteristic detecting system according to claim 23, wherein said antifogging coating is made up from a composition including inorganic alkoxide and at least one polymer having OH radicals formed from the inorganic alkoxide by hydrolysis and poly-condensation.

27. An eyeball-characteristic detecting system according to claim 23, wherein said antifogging coating has a thickness between 0.5 µm and 10 µm inclusive.

28. An eyeball-characteristic detecting system according to claim 23, wherein the surface having said antifogging coating further has an antireflection coating.

29. An eyeball-characteristic detecting system according to claim 28, wherein said antireflection coating is a thin film of high refractive index made from metal alkoxide or at least one of composites of metal alkoxide and inorganic materials.

30. An eyeball-characteristic detecting system according to claim 28, wherein said antireflection coating is a porous inorganic coating.

31. An eyeball-characteristic detecting system according to claim 28, wherein said antireflection coating has a reflectance of not more than 2% for the light emitted from said light source.

* * * * *

UNITED STATES PATENT AND TRADEMARK OFFICE
CERTIFICATE OF CORRECTION

PATENT NO. : 6,055,376
DATED : April 25, 2000
INVENTOR(S) : Keiji OHTAKA, et al.

It is certified that error appears in the above-identified patent and that said Letters Patent is hereby corrected as shown below:

COLUMN 2:

Line 56, "is" should be deleted.

COLUMN 4:

Line 19, "25 mm.," should read --25 mm,--.

COLUMN 5:

Line 54, "in" should read --from--; and "the" (second occurrence) should be deleted.

COLUMN 6:

Line 38, "gap of necessary minimum" should read --a gap of a necessary minimum amount--.

COLUMN 8:

Line 1, "is" should read --are--.
Line 2, "are" should read --is--.
Line 48, "of" should be deleted.

UNITED STATES PATENT AND TRADEMARK OFFICE
CERTIFICATE OF CORRECTION

PATENT NO.    : 6,055,376
DATED         : April 25, 2000
INVENTOR(S)   : Keiji OHTAKA, et al.

It is certified that error appears in the above-identified patent and that said Letters Patent is hereby corrected as shown below:

COLUMN 9:

Line 25, "be left" should read --remain--.
Line 26, "is difficult to remove" should read --has difficulty removing--.

COLUMN 10:

Line 8, "in" should read --from--; and "the" (second occurrence) should be deleted.

Signed and Sealed this

Twenty-second Day of May, 2001

Attest:

NICHOLAS P. GODICI

*Attesting Officer*   *Acting Director of the United States Patent and Trademark Office*